US011005697B2

(12) United States Patent
Liston et al.

(10) Patent No.: US 11,005,697 B2
(45) Date of Patent: May 11, 2021

(54) ORTHOGONAL FREQUENCY-DIVISION MULTIPLEXING EQUALIZATION USING DEEP NEURAL NETWORK

(71) Applicant: Cisco Technology, Inc., San Jose, CA (US)

(72) Inventors: Robert Edward Liston, Menlo Park, CA (US); John George Apostolopoulos, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 71 days.

(21) Appl. No.: 16/558,942

(22) Filed: Sep. 3, 2019

(65) Prior Publication Data

US 2021/0067397 A1    Mar. 4, 2021

(51) Int. Cl.
*H04L 27/26* (2006.01)
*H04L 27/01* (2006.01)
*G06N 3/08* (2006.01)

(52) U.S. Cl.
CPC .......... *H04L 27/2649* (2013.01); *G06N 3/08* (2013.01); *H04L 27/01* (2013.01)

(58) Field of Classification Search
CPC ........ H04L 27/2649; H04L 27/01; G06N 3/08
See application file for complete search history.

(56) References Cited

U.S. PATENT DOCUMENTS

| 10,217,047 | B2 | 2/2019 | O'Shea |
| 10,217,346 | B1 | 2/2019 | Zhang et al. |
| 10,305,553 | B2 | 5/2019 | O'Shea et al. |
| 10,305,766 | B1 | 5/2019 | Zhang et al. |

OTHER PUBLICATIONS

Qisheng Huang et al., Cascade-Net: a New Deep Learning Architecture for OFDM Detection, arxiv.org, Nov. 30, 2018, 5 pages, arXiv:1812.00023v1 [eess.SP].
Tim O'Shea et al., An Introduction to Deep Learning for the Physical Layer, arxiv.org, Jul. 11, 2017, 13 pages, arXiv:1702.00832v2 [cs.IT].
Hao Ye et al., Power of Deep Learning for Channel Estimation and Signal Detection in OFDM Systems, arxiv.org, Aug. 28, 2017, 4 pages, arXiv:1708.08514v1 [cs.IT].
Sebastian Dörner et al., Deep Learning Based Communication Over the Air, IEEE Journal of Selected Topics in Signal Processing, Dec. 15, 2017, pp. 132-143 (vol. 12 , Issue: 1 , Feb. 2018).

*Primary Examiner* — Gbemileke J Onamuti
(74) *Attorney, Agent, or Firm* — Merchant & Gould P.C.

(57) ABSTRACT

Orthogonal frequency-division multiplexing (OFDM) equalization using a Deep Neural Network (DNN) may be provided. First, a signal in a packet structure may be received at an OFDM receiver from an OFDM transmitter. The signal may have distortion. Training constellation points, pilot constellation points, and data constellation points may be extracted from the signal based on the packet structure. Each data constellation point may correspond to a data subcarrier within a data symbol of the signal. Next, the training constellation points and the pilot constellation may be provided as input for the data symbol to a DNN. A coefficient for each data subcarrier within the data symbol that reverses the distortion may be received as output from the DNN. Then, the coefficient for each data subcarrier may be applied to the corresponding data constellation point to determine a per subcarrier constellation point prediction.

20 Claims, 5 Drawing Sheets

ORTHOGONAL FREQUENCY-DIVISION MULTIPLEXING EQUALIZATION USING DEEP NEURAL NETWORK

TECHNICAL FIELD

The present disclosure relates generally to Orthogonal Frequency-Division Multiplexing (OFDM) communication systems.

BACKGROUND

OFDM is a widely used modulation technique for wired and wireless communication systems, and is a building block to enable Orthogonal Frequency-Division Multiple Access (OFDMA). A signal may become distorted as it is transmitted over a communication channel from an OFDM transmitter to an OFDM receiver due to channel impairments, as well as nonlinearities of the OFDM transmitter and receiver. OFDM receiver performance may be limited by the receiver's ability to compensate for the signal distortion induced by the end-to-end communication channel. Challenging channel conditions, such as crowded spaces, moving clients, low signal-to-noise ratio (SNR), vehicular speeds, or interference can further increase signal distortion and degrade OFDM receiver performance. OFDM equalization may be performed to compensate for and overcome the various forms of distortion.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
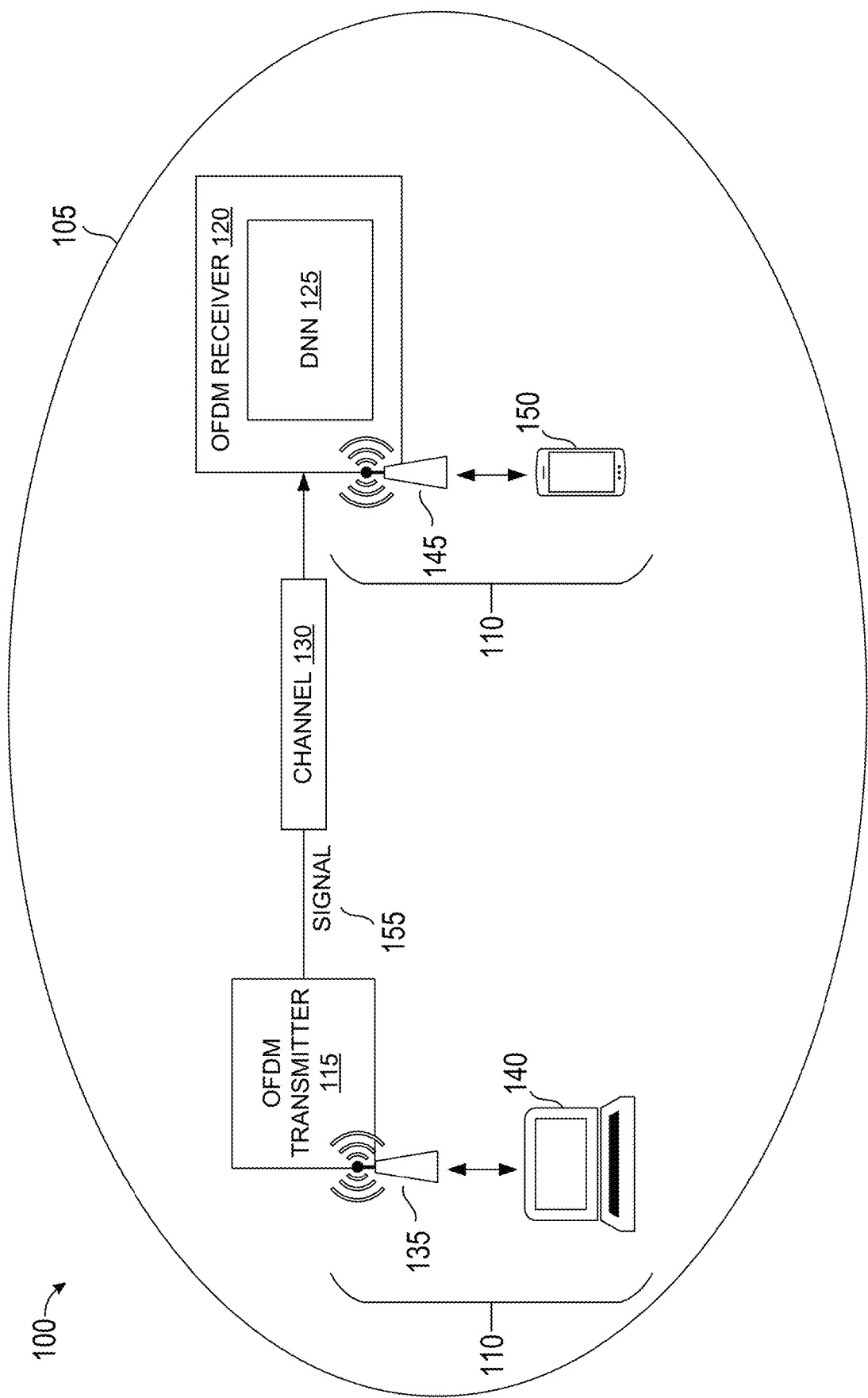
FIG. 1 shows an operating environment for OFDM equalization.

OFDM equalization using a DNN may be provided. First, a signal in a packet structure may be received at an OFDM receiver from an OFDM transmitter. The signal may have distortion. Training constellation points, pilot constellation points, and data constellation points may be extracted from the signal based on the packet structure. Each data constellation point may correspond to a data subcarrier within a data symbol of the signal. Next, the training constellation points and the pilot constellation may be provided as input for the data symbol to a DNN. A coefficient for each data subcarrier within the data symbol that reverses the distortion may be received as output from the DNN. Then, the coefficient for each data subcarrier may be applied to the corresponding data constellation point to determine a per subcarrier constellation point prediction.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

OFDM equalization may be performed to compensate for and overcome distortion that occurs as a signal is transmitted over a communication channel from an OFDM transmitter to an OFDM receiver. Typically, the OFDM receiver incorporates a per-data symbol equalization function to perform the OFDM equalization. For example, the per-data symbol equalization function may be a fixed function implemented to process each data symbol of the signal, where the processing often relies on linear transformations and a fixed set of heuristics. In typical implementations, the function may be fixed (e.g., a linear transformation) and parameters of the linear transformation may be adapted for equalization. While the processing may provide accurate estimations of the distortion under normal channel conditions, it often fails under challenging channel conditions, such as crowded spaces, moving clients, low Signal-to-Noise Ratio (SNR), vehicular speeds, or interference. Additionally, the processing does not account for nonlinearities of the OFDM transmitter and receiver, which contribute to the distortion of the signal.

Embodiments of the disclosure provide OFDM equalization using a DNN. The DNN may perform a learned function rather than a fixed function on a per data symbol basis to estimate and reverse the distortion occurring over the channel. By implementing the DNN, distortions may be more accurately estimated under challenging conditions. As one example of a challenging condition, a noisy signal may be received due to the OFDM transmitter being far away or having limited transmission power (e.g., because the transmitter is battery constrained, among other similar examples). The DNN may provide an increased ability to receive the noisy signal, which may effectively allow for an increased range for the OFDM transmitter and OFDM receiver. Additionally, by implementing the DNN, nonlinearities of the OFDM transmitter and OFDM receiver contributing to the distortion of the signal may be accounted for, further enhancing accuracy of the prediction. Moreover, the DNN may learn over time based not only on the channel but based on the specific OFDM transmitter and/or OFDM receiver associated with the transmitted signal.

Embodiments of the disclosure may also be generally applicable for OFDMA, a multi-user version of OFDM. In some examples, the implementation of the DNN may vary based on a type of OFDMA transmission (e.g., single transmitter to single receiver vs. multiple transmitters to single receiver), described in greater detail herein.

FIG. 1 shows an operating environment 100 for OFDM equalization. As shown in FIG. 1, operating environment 100 may comprise a network 105. Network 105 may be a wireless network, such as a Wireless Local Area Network (WLAN). Network 105 may comprise at least stations 110, an OFDM transmitter 115, and an OFDM receiver 120 including a DNN 125, where OFDM transmitter 115 and OFDM receiver 120 may be communicatively coupled over a communication channel 130. Communication channel 130 may be a Radio Frequency (RF) wireless channel. In other examples, communication channel 130 may be a wired channel.

Stations 110 may include components capable of connecting to network 105. For example, stations 110 may be equipped with Wireless Network Interface Controllers (WNICs) that enable the connection to network 105. Access points and clients may be two example types of stations 110. The access points, such as first access point 135 and second access point 145, may be networking hardware devices that enable other devices, such as first client 140 and second client 150, to connect to network 105. Additionally, the access points, such as first access point 135 and second access point 145, may serve as transmitters and receivers of signals between clients, such as first client 140 and second client 150, over network 105. The clients may include a desktop computer, a laptop computer, a tablet computer, a smart phone, or wearable computing device, among other similar devices capable of accessing and using network 105 via the access points.

As illustrated, first client 140 may be a laptop computer associated with first access point 135 to connect to network 105, and second client 150 may be a smart phone associated with second access point 145 to connect to network 105. First access point 135 may receive data to be transmitted over network 105 from first client 140 to second client 150. The data may be transmitted utilizing OFDM transmitter 115 of first access point 135 and OFDM receiver 120 of second access point 145. For example, OFDM transmitter 115 may transmit a signal 155 to OFDM receiver 120 over communication channel 130. Signal 155 may be transmitted in a burst comprised of a packet. An example packet structure may consist of a preamble comprising one or more training fields, a header comprising control information associated with delivery of packet, and a payload comprised of the actual data intended for transmission.

Figure 3:
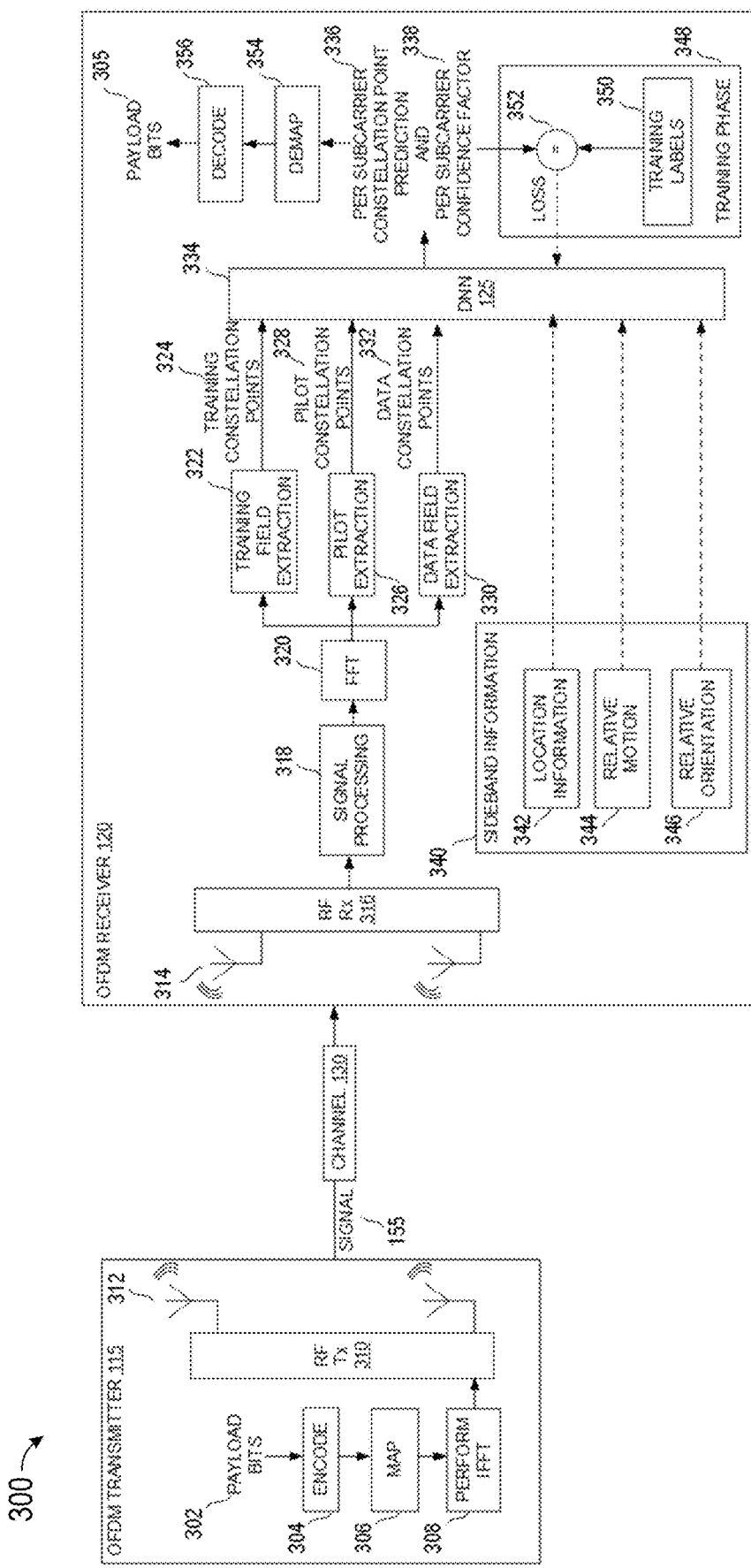
FIG. 3 is a process flow diagram illustrating OFDM equalization using a DNN.

To generate signal 155, OFDM transmitter 115 may perform several operations, as described in detail with respect to FIG. 3. As signal 155 is transmitted from OFDM transmitter 115 to OFDM receiver 120 over communication channel 130, signal 155 may become distorted due to channel impairments. For example, the signal may be scaled, rotated, translated, stretched and/or skewed, among other similar distortions. Example channel impairments may include frequency selective attenuation, reflections, Doppler Effect, and interferers such as sources of Radio Frequency (RF) and/or electromagnetic radiation, among other examples. Additionally, signal 155 may be further distorted at transmission and upon receipt due to nonlinearities of Integrated Circuits (ICs) and antennas of OFDM transmitter 115 and OFDM receiver 120, respectively.

Upon receipt of signal 155 at OFDM receiver 120, OFDM receiver 120 may perform several operations to yield the actual data intended for transmission. The operations may include inverse operations to those performed at OFDM transmitter 115 to generate signal 155, which are described in greater detail with respect to FIG. 3. The operations may also include an equalization operation to compensate for or reverse the distortion caused to signal 155. DNN 125 may be implemented to perform the equalization operation. For example, DNN 125 may utilize inputs extracted from signal 155 that have known data values at the OFDM transmitter 115. Therefore, DNN 125 may utilize the known data expected to be transmitted from OFDM transmitter 115 and the inputs actually received and extracted at OFDM receiver 120 in order to estimate a distortion that occurred and a coefficient operative to reverse the distortion.

In some embodiments, OFDMA may be supported. For example, in an OFDMA transmission where a signal is transmitted from a single OFDMA transmitter to a single OFDMA receiver over a communication channel, DNN 125 may process inputs as described above with respect to OFDM to estimate a distortion that occurred and a coefficient operative to reverse the distortion. In other OFDMA scenarios, an OFDMA receiver may receive signals from at least two different OFDMA transmitters during a same transmission opportunity. In such scenarios, respective signals may be received at OFDMA receiver over at least two different subchannels of communication channel 130. DNN 125 may process inputs extracted from each signal separately to account for the different distortion occurring over each subchannel, as described in greater detail with respect to FIG. 4.

In further embodiments, multiple-input and multiple-output (MIMO) may be supported. For example, a number of inputs to DNN 125 may be multiplied by N, where N is the number of receive chains. Likewise, the number of outputs may be multiplied by M, where M is the number of MIMO spatial streams.

The elements described above of operating environment 100 (e.g., network 105, stations 110, OFDM transmitter 115, OFDM receiver 120, DNN 125, and communication channel 130) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

While network 105 in operating environment 100 is described as a WLAN, embodiments of OFDM equalization as described herein may also be applied to other OFDM communication systems, including both wired and wireless OFDM communication systems.

Figure 2:
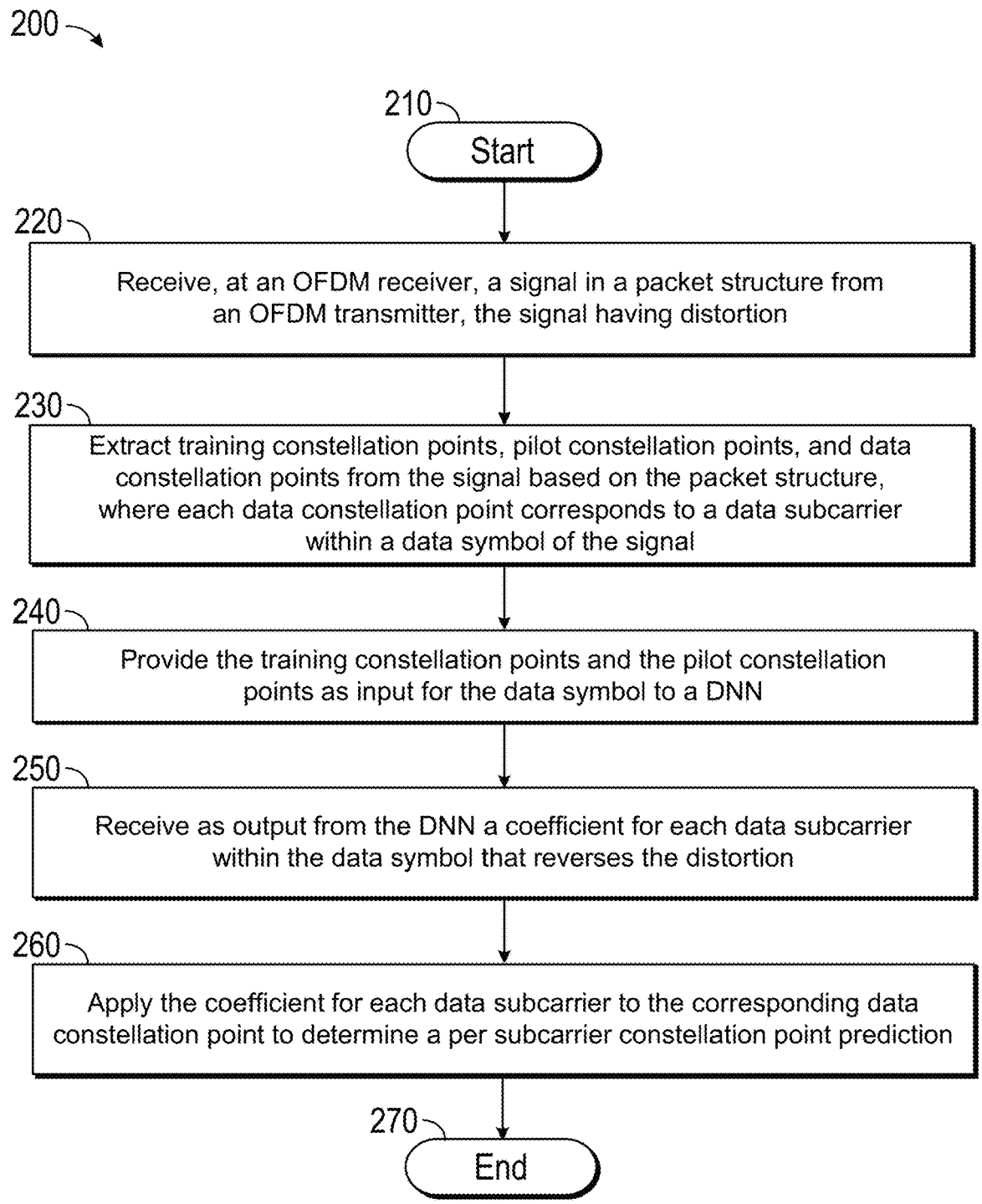
FIG. 2 is a flow chart of a method for OFDM equalization using a deep neural network (DNN)

FIG. 2 is a flow chart setting forth the general stages involved in a method 200 consistent with embodiments of the disclosure for OFDM equalization using DNN 125. Method 200 may be implemented using OFDM receiver 120 comprising DNN 125, as described in FIG. 1. Ways to implement the stages of method 200 will be described in greater detail below.

Method 200 may begin at starting block 210 and proceed to stage 220 where signal 155 may be received in a packet structure at OFDM receiver 120 from OFDM transmitter 115. The packet structure may include a preamble comprising one or more training fields, a header comprising control information associated with delivery of the packet, and a payload comprised of actual data for transmission. Additionally, signal 155 may have distortion. The distortion may be due to nonlinearities in the ICs and antennas of OFDM transmitter 115 and OFDM receiver 120, as well as channel impairments of communication channel 130 over which signal 155 was transmitted.

From stage 220 where signal 155 is received, method 200 may advance to stage 230 where training constellation points, pilot constellation points, and data constellation points may be extracted from signal 155 based on the packet structure. Training constellation points may be extracted from the preamble on a per packet basis, whereas pilot constellation points and data constellation points may be extracted from the payload on a per data symbol basis. For example, as described in greater detail with respect to FIG. 3, a data symbol within the payload may include subcarriers. The subcarriers may include both pilot subcarriers and data subcarriers. Each pilot constellation point may correspond to a pilot subcarrier within the data symbol. Each data constellation point may correspond to a data subcarrier within the data symbol.

Once the training constellation points, pilot constellation points, and data constellation points are extracted at stage 230, method may advance to stage 240 where the training constellation points and the pilot constellation points may be provided as input for the data symbol to DNN 125. The training constellation points and the pilot constellation points may comprise known data at the OFDM transmitter 115.

In response to providing the input to DNN 125 at stage 240, method 200 may advance to stage 250 where a coefficient for each data subcarrier within the data symbol that reverses the distortion may be received as output from DNN 125. For example, DNN 125 may utilize the known data (e.g., training constellation points and the pilot constellation points) expected to be transmitted from OFDM transmitter 115 and the training constellation points and the pilot constellation points actually received and extracted at OFDM receiver 120 to estimate a distortion that occurred and a coefficient operative to reverse the distortion.

Upon receipt of the coefficient for each data subcarrier at stage 250, the coefficient for each data subcarrier may be applied to the corresponding data constellation point to determine a per subcarrier constellation point prediction at stage 260. For example, the per subcarrier constellation point prediction may predict original data constellation points that were mapped to the data subcarriers at OFDM transmitter 115 prior to transmission and thus prior to distortion. In some examples, a per subcarrier confidence factor may be determined along with the per subcarrier constellation point prediction.

Once the per subcarrier constellation point prediction is determined at stage 260, method 200 may then end at stage 270. In some embodiments, stages 230, 240, 250, and 260 may be repeated for each data symbol within the payload of signal 155.

FIG. 3 is a process flow diagram 300 illustrating OFDM equalization using DNN 125. OFDM transmitter 115 may transmit signal 155 to OFDM receiver 120 over communication channel 130. Signal 155 may be transmitted in the packet structure that includes the preamble comprising one or more training fields, the header comprising control information associated with delivery of the packet, and the payload comprised of the actual data for transmission. The actual data to be transmitted may be represented by a serial stream of bits, hereinafter referred to as original payload bits 302.

Prior to transmission of signal 155, OFDM transmitter 115 may perform several operations. For example, at an encoding operation 304, redundant coding of original payload bits 302 may be performed in a Boolean domain to reduce error in data transmission over communication channel 130. In some embodiments, an error-correcting code may be utilized. As one example, original payload bits 302 may be fed into a forward error correction (FEC) encoder, where the FEC encoder may be a low-density parity-check (LDPC) encoder. Additionally, at encoding operation 304, scrambling of original payload bits 302 may be performed in the Boolean domain so that the 1 to 0 density is approximately equal. As a result of encoding operation 304, additional bits may be added to the serial stream of bits (e.g., added to the original payload bits 302) creating a modified serial stream of bits, the modified serial stream of bits hereinafter referred to as modified payload bits.

At a mapping operation 306, the modified payload bits may be divided into groups comprised of n bits, where n may be dependent on a type of modulation scheme being implemented. Example modulation schemes may include quadrature amplitude modulation (e.g., 16-QAM, 64-QAM, 256-QAM, or 1024-QAM) or phase-shift keying (e.g., BPSK or QPSK). Each group of modified payload bits may correspond to a data symbol, where the data symbol is a complex number mapped to a plurality of data constellation points. Each data constellation point may be further mapped to a data subcarrier and assigned to one or more antennas to yield a data constellation point per data subcarrier per antenna. As one example, a data symbol within a 802.11a or 802.11g packet may comprise 48 constellation points corresponding to 48 data subcarriers. The data symbol may be inserted within a payload of the packet structure. Accordingly, the payload may comprise one or more data symbols corresponding to a number of groups of modified payload bits.

Additionally, at mapping operation 306, known pilot constellation points are each mapped to a pilot subcarrier and assigned to one or more antennas to yield a pilot constellation point per pilot subcarrier per antenna. The known constellation points may be inserted into each data symbol within the payload (e.g., into each group of modified payload bits). The known pilot constellation points inserted into each of the data symbols may be unique to the respective data symbol. Continuing the example above, the data symbol within the 802.11a or 802.11g packet may comprise 48 constellation points corresponding to 48 data subcarriers, and 4 pilot constellation points corresponding to 4 pilot subcarriers such that the data symbol comprises 52 subcarriers total.

Further, at mapping operation 306, training fields comprised of known data values may each correspond to a training symbol that is mapped to a training constellation point. Each training constellation point may then be further mapped to a training subcarrier and assigned to one or more antennas to yield a training constellation point per training subcarrier per antenna. The training symbols may be inserted within the preamble of the packet structure prior to the header and the payload.

The training constellation point per training subcarrier per antenna, the pilot constellation point per pilot subcarrier per antenna, and the data constellation point per data subcarrier per antenna output by mapping operation 306 may be collectively referred to as the constellation points output by mapping operation 306.

The constellation points output by mapping operation 306 may be in a frequency domain. An Inverse Fast Fourier Transform (IFFT) operation 308 may then be performed to convert the constellation points output by mapping operation 306 to a time domain to yield a time domain signal. An RF Transmitter (RF Tx) 310 of OFDM transmitter 115 may upconvert the time domain signal with a carrier frequency to generate signal 155 for transmission. Signal 155 may then be transmitted from an antenna 312 of RF Tx 310 over communication channel 130, and received at an antenna 314 of RF receiver (RF Rx) 316 at OFDM receiver 120.

Upon receipt of signal 155, OFDM receiver 120 may perform several operations to yield original payload bits 302. The operations may include inverse operations to those performed at OFDM transmitter 115, as well as an equalization operation. For example, RF Rx 316 may down convert signal 155 to a baseband time domain signal. At a signal processing operation 318, Automatic Gain Control (AGC), Start of Packet (SOP) detection, and Clear Channel Assessment (CCA) may be performed to detect a roughly framed time domain signal (e.g., a roughly framed packet structure) from the baseband time domain signal. For example, the roughly framed packet structure may include at least the preamble comprised of training fields and a tail of the packet (e.g., information that follows the payload). Additionally, at the signal processing operation 318, a Carrier Frequency Offset (CFO) between OFDM transmitter 115 and OFDM receiver 120 may be estimated and corrected utilizing data extracted from the training fields of the preamble. Once CFO is performed, the roughly framed packet structure may be more precisely aligned, and the packet structure may be divided into symbols (e.g., training symbols, header symbols, data symbols). A Fast Fourier Transform (FFT) operation 320 may then be performed to convert the symbols to symbol by symbol constellation points that are in the frequency domain (e.g., the constellation points output by mapping operation 306). However, these constellation points may be distorted from the constellation points actually output by mapping operation 306 at OFDM transmitter 115.

For example, as signal 155 was transmitted over communication channel 130, several factors may have caused the distortion, where the distortion may include scaling, rotation, translation, stretching and/or skewing, among other similar examples. One factor leading to distortion may include nonlinearities of ICs and antennas of OFDM transmitter 115, as well as nonlinearities of ICs and antennas of OFDM receiver 120, causing distortion at transmission and receipt respectively. Another factor may be impairments of communication channel 130 over which signal 155 was transmitted. For example, frequency selective attenuation, reflections, Doppler Effect, and/or interferers such as sources of Radio Frequency (RF) and/or electromagnetic radiation, among other examples, may occur or may be present within communication channel 130. Therefore, equalization may need to be performed at OFDM receiver 120 to reverse the distortion in order to retrieve the original payload bits 302.

The equalization may be performed on a per data symbol basis utilizing DNN 125 at equalization operation 334. Training constellation points 324 and pilot constellation points 328 may serve as input to DNN 125. Constellation points, such as training constellation points 324 and pilot constellation points 328, may be represented as complex numbers, and these complex numbers may be separated into real and imaginary components within DNN 125.

Because training constellation points 324 are consistent for all data symbols within the payload, the same training constellation points 324 may be provided as input for each data symbol of signal 155. However, because pilot constellation points 328 inserted within each data symbol are unique, pilot constellation points 328 specific to the data symbol being analyzed are provided as input. Therefore, to retrieve input for DNN 125, several extraction operations (e.g., operations 322, 326, and 330) may be performed following FFT operation 320 to retrieve the individual types of constellation points from the symbol by symbol constellation points output from the FFT operation 320. For example, training constellation points 324 may be extracted on a per packet basis from the preamble (e.g., from training symbols within the preamble) at a training field extraction operation 355. Pilot constellation points 328 may be extracted on a per data symbol basis at a pilot extraction operation 365. Additionally, data constellation points 332 may be extracted on a per data symbol basis at a data field extraction operation 375.

In some embodiments, pilot constellation points 328 may follow a pseudo random sequence (e.g., a known variation per data symbol), and the known variation may be compensated or removed before providing pilot constellation points 328 as input to DNN 125. In further embodiments, both training constellation points 324 and pilot constellation points 328 may be normalized in order to match a dynamic range of features of training constellation points 324 and pilot constellation points 328 before providing as input to DNN 125.

For each data symbol, training constellation points 324 and pilot constellation points 328 of the respective data symbol may be provided as input to DNN 125 to estimate the distortion and determine a coefficient for each data subcarrier of the respective data symbol that compensates for or reverses the distortion. For example, as previously discussed, the training fields and pilot constellation points 328 are known data values at OFDM transmitter 115. Therefore, DNN 125 may utilize the known data expected to be transmitted from the OFDM transmitter 115 and the training constellation points 324 and pilot constellation points 328 actually received and extracted at OFDM receiver 120 in order to estimate a distortion that occurred and a coefficient for each data subcarrier operative to reverse the distortion.

The coefficient for each data subcarrier output by DNN 125 may then be applied to a corresponding data constellation point from data constellation points 332 extracted from the respective data symbol to determine a per subcarrier constellation point prediction 336. For example, per subcarrier constellation point prediction 336 may predict original data constellation points that were mapped to the data subcarriers and assigned to the one or more antennas during mapping operation 306 at OFDM transmitter 115 prior to transmission and thus prior to distortion. In other words, the per subcarrier constellation point prediction 336 may predict the data constellation point per data subcarrier per antenna yielded by mapping operation 306.

In some embodiments, a per subcarrier confidence factor 338 may be determined along with the per subcarrier constellation point prediction 336. The per subcarrier confidence factor may be a function of both the distortion and the noise or interference in the environment. Additionally, although the above described equalization operation 334 is an example of a single parameter or one tap filter equalization, the equalization operation 385 may involve multiple parameters and may have a time duration (e.g., may be a multi-tap filter equalization) in other embodiments.

DNN 125 may have a monolithic architecture or a structured architecture comprising one or more sections of layers to process training constellation points 324 and pilot constellation points 328. In one example, DNN 125 may have a structured architecture that reflects underlying signal 155, as described in detail with respect to FIG. 4. Additionally, in some embodiments, sideband information 340 may be used to condition DNN 125. Sideband information 340 may include location information 342, relative motion information 344, and relative orientation information 346 that may be applied when a received signal is associated to a specific client, such as signal 155 associated to first client 140. For example, channel state information history may be used to estimate relative motion between first access point 135 and first client 140. Knowledge of whether first client 140 is moving relative to first access point 135 may be important when selecting the preferred mode of communicating between first access point 135 and first client 140. In another example, the orientation of antennas of first client 140 relative to antennas of first access point 135 may also be accounted for (e.g., using the gyroscope and magnetometer, etc.).

Initially, DNN 125 may be trained using real world data, simulated data, or a combination thereof. For example, when DNN 125 is in a training phase 348, the above-described operations are performed at OFDM receiver 120 upon receipt of a signal from an OFDM transmitter, such as signal 155 from OFDM transmitter 115, to determine per subcarrier constellation point prediction 336 and per subcarrier confidence factor 338 on a per data symbol basis. Training labels 350 may be comprised of ground truth constellation points from OFDM transmitter 115 (e.g., known data constellation points mapped to each data subcarrier of the respective data symbol during mapping operation 306 at OFDM transmitter 115). A loss function 352, such as absolute difference or mean squared error, may be performed using the training labels 350 and per subcarrier constellation point prediction 336 to determine discrepancies between the labels and predictions. Results of loss function 352 may be fed back to DNN 125 to facilitate and improve learning. Additionally, per subcarrier confidence factor 338 may be utilized in loss function 352. Once DNN 125 is sufficiently trained, training phase 348 may end and DNN 125 may be applied in real time to received signals whose ground truth constellation points are not known to determine per subcarrier constellation point prediction 336 and per subcarrier confidence factor 338 on a per data symbol basis.

As previously discussed, the per subcarrier constellation point prediction 336 may, in other words, predict the data constellation point per data subcarrier per antenna yielded by mapping operation 306. Therefore, once per subcarrier constellation point prediction 336 is received as output of DNN 125, a decision boundary may be applied to the predicted data constellation point per data subcarrier per antenna at a demapping operation 354 to yield a group of n bits. Additionally, the group of n bits may be degrouped to provide a serial bit sequence. For example, the serial bit sequence may correspond to the modified payload bits (e.g., the original bit sequence plus additional bits added). At a decoding operation 456, the modified payload bits may be descrambled and decoded to yield original payload bits 302.

Figure 4:
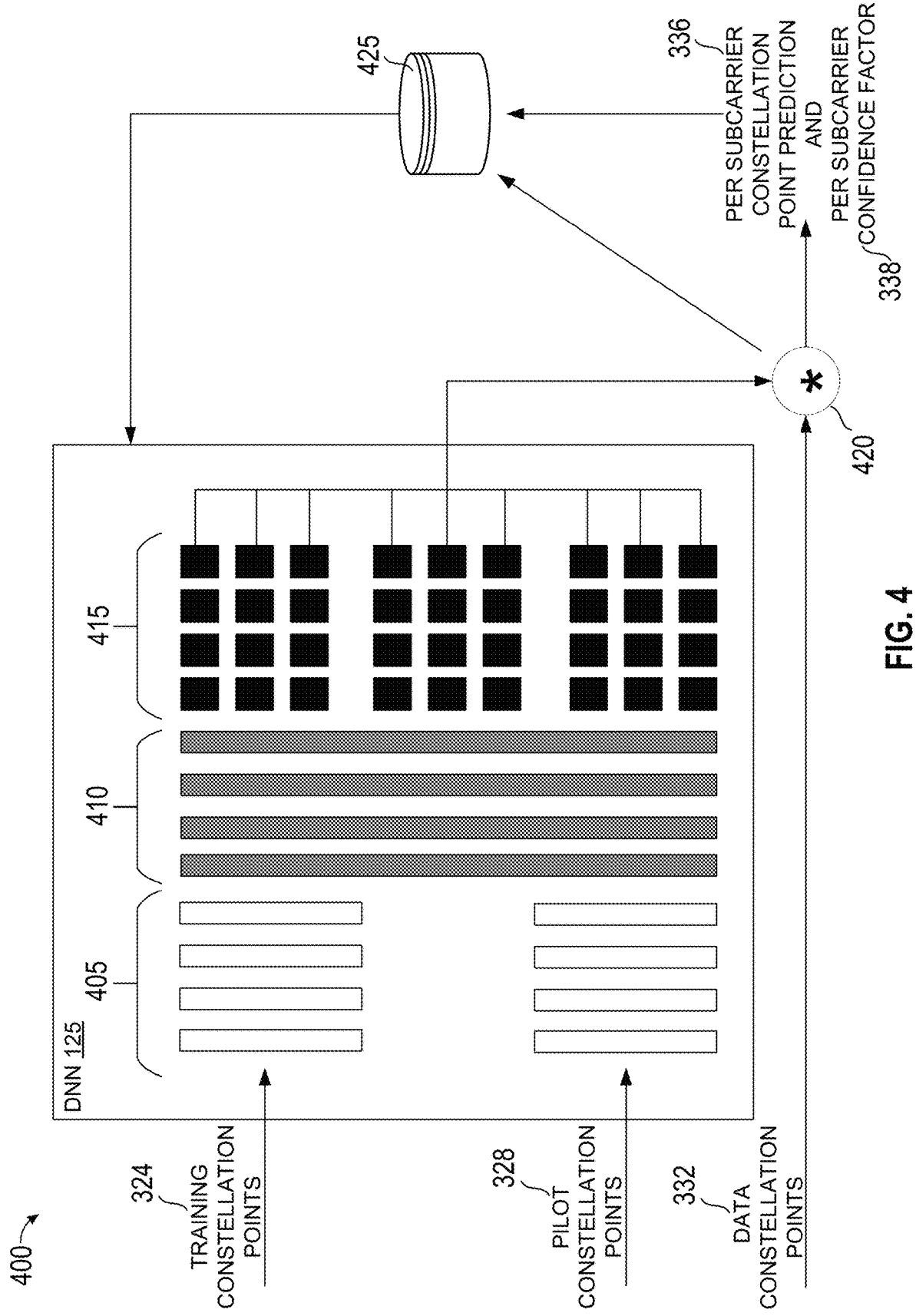
FIG. 4 is a diagram depicting an example architecture for a DNN.

FIG. 4 is a diagram 400 depicting an example architecture for DNN 125. For a data symbol of signal 155, inputs including training constellation points 324 extracted from the preamble and pilot constellation points 328 extracted from the data symbol of the payload may be provided as input to DNN 125. Training constellation points 324 and pilot constellation points 328 may comprise known data values at OFDM transmitter 115. DNN 125 may utilize the known data expected to be transmitted from OFDM transmitter 115 and training constellation points 324 and pilot constellation points 328 actually received and extracted at OFDM receiver 120 to estimate a distortion that occurred to signal 155 during transmission from OFDM transmitter 115 to OFDM receiver 120, and determine a coefficient for each data subcarrier operative to reverse the distortion.

Operation 420 may be a complex multiplication operation where the coefficient for each data subcarrier may be applied to a corresponding data constellation point from data constellation points 332 extracted from the data symbol to determine a per subcarrier constellation point prediction 336. For example, data constellation points 332 may be represented as complex numbers and at operation 420, the coefficient may be multiplied with these complex numbers. In some embodiments, a per subcarrier confidence factor 338 may be determined along with per subcarrier constellation point prediction 336. Per subcarrier confidence factor 338 may be a function of both the distortion and the noise or interference in the environment. In further embodiments, a per subcarrier estimate of the noise and/or interference may be estimated and applied to improve the processing performed by DNN 125. For example, the per subcarrier noise and/or interference estimate may be used with per subcarrier confidence factor 338 and the coefficient for each data subcarrier for reversing the distortion to determine the preferred processing.

In some embodiments, DNN 125 may have a structured architecture that reflects underlying signal 155 to facilitate learning. For example, DNN 125 may have three sections of layers that are applied on a per data symbol basis. A first section 405 may comprise layers that learn independent representations of each of the inputs. For example, first section 405 may comprise layers that learn an independent representation of training constellation points 324 and layers that learn an independent representation of the pilot constellation points 328. A second section 410 may combine the learned independent representations of training constellation points 324 and pilot constellation points 328 from first section 405. A third section 415 may represent the data subcarriers within the data symbol to which data constellation points 332 correspond, and may determine a coefficient for each data subcarrier within the data symbol that compensates for or reverses the distortion based on the combined independent representations. For example, for a data symbol within a 802.11a or 802.11g packet, the third section 415 may represent 48 data subcarriers corresponding to 48 constellation points to determine 48 coefficients.

In some embodiments, third section 415 may comprise groups of data subcarriers, particularly if a number of data subcarriers is large based on a standard protocol utilized. For example, as illustrated, a data symbol within a 802.11ax HESU packet may have 234 data subcarriers, and thus the third section 415 may represent 234 data subcarriers. Each of the horizontal stacks in the third section 415 may correspond to a group of subcarriers (e.g., a Resource Unit (RU)). Here, there are 9 horizontal stacks, and thus 9 RUs with each RU comprising 26 subcarriers. When large numbers of data subcarriers are present, the data subcarriers may be grouped in this manner to improve efficiency of the DNN computation, for example, by predicting only 9 coefficients at once rather than predicting all 234 coefficients at once.

A number of layers in each section and/or RUs per layer in the architecture may vary, where the number of layers may also be zero. The layers may be densely connected, convolutional, or recurrent. Each layer may include a non-linear activation function that defines the output for the respective layer given the inputs to the respective layer. In some embodiments, the architecture may also include a normalization layer in between each layer and/or in between each section of layers.

The architecture of DNN 125 may also include different mechanisms to store and utilize the learnings over time. For example, the coefficients applied in operation 420, per subcarrier constellation point prediction 336, per subcarrier confidence factor 338 and the per subcarrier noise and/or interference estimate may be stored for a respective client, such as first client 140, in a database 425 associated with DNN 125 along with client specific information. This stored information may be used to help DNN 125 predict the next coefficient per subcarrier per antenna for the first client 140. In some examples, the next coefficient per subcarrier per antenna may be for subsequent data symbols of the same packet (e.g., same signal 155) or for subsequent packets transmitted by the first client 140. Therefore, instead of treating each future transmission involving the first client 140 separately and re-predicting the equalization for each transmission, the prediction can be learned and refined over multiple transmissions, which may provide a more accurate estimate and therefore better performance.

The above embodiments describe implementation of DNN 125 for an OFDM transmission where a signal is transmitted from a single OFDM transmitter to a single OFDM receiver over a communication channel. In further embodiments, OFDMA may be supported, however a manner in which DNN 125 is implemented may vary based on a type of OFDMA transmission. For example, in an OFDMA transmission involving a single OFDMA transmitter and a single OFDMA receiver (e.g., where subcarriers of the signal are transmitted over a single subchannel or a single RU), DNN 125 may process inputs as described above with respect to OFDM to estimate a distortion that occurred to the signal and a coefficient operative to reverse the distortion. Alternatively, because OFDMA receivers are enhanced OFDM receivers having additional capabilities to receive multiple transmissions at a same time, an OFDMA receiver may receive signals from at least two different OFDMA transmitters at a same time. For example, in some embodiments, OFDM receiver 120 may be an enhanced OFDMA receiver and in such multiple transmission scenarios, respective subcarriers of each signal may be received over at least two different subchannels of a same communication channel, such as communication channel 130 (e.g., two groups of subcarriers may be received, one over each subchannel). DNN 125 may process at least a portion of the signals separately to account for the different distortion occurring over each subchannel.

As one example scenario, access point 145 may be receiving signals from two clients, client X and Y, each associated with a different OFDMA transmitter (e.g., a first signal from a first OFDMA transmitter associated with client X and a second signal from a second OFDMA transmitter associated with client Y). Access point 145 may select for a given signal transmission opportunity to split communication channel 130 into two subchannels, first subchannel A and second subchannel B. First subchannel A may be associated with a RU A for client X, and second subchannel B may be associated with a RU B for client Y. Group A subcarriers of the first signal may be transmitted from the first OFDMA transmitter of client X over first subchannel A. Group B subcarriers of the second signal may be transmitted from the second OFDMA transmitter of client Y over second subchannel B.

During transmission, the group A subcarriers and the group B subcarriers may be exposed to different channel impairments and have different received signal powers (e.g., because client X may be closer to access point 145 than client Y) resulting in different distortions. DNN 125 may be implemented to explicitly account for the different distortions undergone by the first and second signals. For example, DNN 125 may separately process at least a portion of the first and second signals (e.g., separately process at least a portion of the group A subcarriers and the group B subcarriers).

In some embodiments, DNN 125 may be split to act as two separate DNNs, a first DNN for the group A subcarriers of the first signal transmitted over the first subchannel A and a second DNN for the group B subcarriers of the second signal transmitted over the second subchannel B. In other embodiments, a few layers of DNN 125 may be split to separately process a portion of the first and second signals (e.g., a portion of the group A and B subcarriers), while other layers may be shared between the remaining portions of the first and second signals. For example, subcarrier groups to be processed by DNN 125 separately may be determined by OFDMA control data that identifies various subchannels or RUs that are used in a given transmission opportunity. For example, the OFDMA control data may be used to identify a grouping of subcarriers for separate processing by DNN 125. In some embodiments, the grouping of subcarriers identified for separate processing may be processed by separate DNNs (e.g., DNN 125 for one grouping, another DNN for another grouping, and so on). In further embodiments, inputs to DNN 125 may be masked such that only one signal (e.g., one group of subcarriers) may be processed at a time.

In yet further embodiments, DNN 125 may process inputs per subchannel such that DNN 125 processes the subcarriers received from a single OFDM transmitter at a time. In other words, subchannels may be processed sequentially by a same DNN, such as DNN 125. For example, DNN 125 may first process the group A subcarriers transmitted by the first OFDMA transmitter of client X over first subchannel A, and then may subsequently process the group B subcarriers transmitted by the second OFDMA transmitter of client Y over second subchannel B. In other examples, subchannels may be processed in parallel by a plurality of DNNs (e.g., one DNN per subchannel), where each of the plurality of DNNS may be similar to DNN 125 as described herein. For example, a first DNN may process the group A subcarriers transmitted by the first OFDMA transmitter of client X over first subchannel A, while a second DNN may simultaneously process the group B subcarriers transmitted by the second OFDMA transmitter of client Y over second subchannel B. Parallel processing may result in lower latency.

Figure 5:
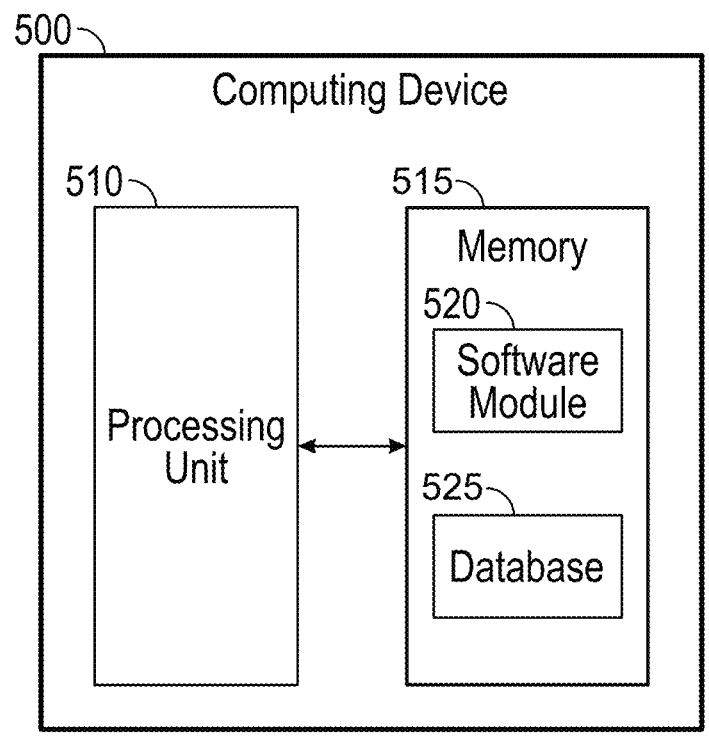
FIG. 5 is a block diagram of a computing device.

The architecture for DNN 125 illustrated in FIG. 5 is a non-limiting example. The methods and processes described herein may be implemented on other types of architecture, including a monolithic architecture and other types of structured architectures comprising one or more sections of layers for processing inputs.

According to some example embodiments, a signal in a packet structure may be received at an OFDM receiver from an OFDM transmitter. The signal may have distortion. Training constellation points, pilot constellation points, and data constellation points may be extracted from the signal based on the packet structure. Each data constellation point may correspond to a data subcarrier within a data symbol of the signal. The training constellation points and the pilot constellation points may be provided as input for the data symbol to a DNN. A coefficient for each data subcarrier within the data symbol that reverses the distortion may be received as output from the DNN. The coefficient for each data subcarrier may be applied to the corresponding data constellation point to determine a per subcarrier constellation point prediction.

In other example embodiments, the packet structure may include a preamble, a header, and a payload, where the training constellation points may be extracted from the preamble, and the pilot constellation points and the data constellation points may be extracted from the data symbol within the payload. Providing the training constellation points and the pilot constellation points as input for the data symbol to the DNN may include applying a first section of layers to learn independent representations of the training constellation points and the pilot constellation points, applying a second section of layers to combine the independent representations learned by the first section, and applying a third section of layers to generate the coefficient for each data subcarrier based on the combined independent representations.

In further example embodiments, a per subcarrier confidence factor associated with the per subcarrier constellation point prediction may be determined. Information of a client associated with an access point that includes the OFDM transmitter may be received. The client information, the coefficient for each data subcarrier, and the per subcarrier constellation point prediction may be stored in a database associated with the DNN.

In yet further embodiments, the per subcarrier constellation point prediction may predict an original data constellation point corresponding to each data subcarrier at the OFDM transmitter prior to transmission of the signal, and the DNN may be trained using labels comprised of a known original data constellation point corresponding to each data subcarrier at the OFDM transmitter. A loss function may be performed using the predicted original data constellation point and the known original data constellation point. The DNN may be conditioned with sideband information from the signal, the side band information including one or more of location information, motion information, and orientation information.

According to other example embodiments, an apparatus may include a memory storage, and a processing unit coupled to the memory storage. The processing unit may be operative to receive a signal in a packet structure at an OFDM receiver from an OFDM transmitter. The signal may have distortion. The processing unit may also be operative to extract training constellation points, pilot constellation points, and data constellation points from the signal based on the packet structure. Each data constellation point may correspond to a data subcarrier within a data symbol of the signal. The processing unit may further be operative provide the training constellation points and the pilot constellation points as input for the data symbol to a DNN, receive as output from the DNN a coefficient for each data subcarrier within the data symbol that reverses the distortion, and apply the coefficient for each data subcarrier to the corresponding data constellation point to determine a per subcarrier constellation point prediction.

According to further example embodiments, receiving at an Orthogonal Frequency-Division Multiplexing (OFDMA) receiver, a first signal in a packet structure transmitted by a first OFDM transmitter over a first subchannel of a communication channel, the first signal having distortion, and a second signal in the packet structure transmitted by a second OFDM transmitter over a second subchannel of the communication channel, the second signal having distortion. For each of the first signal and the second signal, training constellation points, pilot constellation points, and data constellation points may be extracted from the respective signal based on the packet structure, where each data constellation point corresponds to a data subcarrier within a data symbol of the respective signal. The first signal and the second signal may be processed separately to account for a difference in the distortion of the first signal and the second signal. The processing may include providing the training constellation points and the pilot constellation points extracted from the respective signal as input for the data symbol to a DNN, receiving as output from the DNN a coefficient for each data subcarrier within the data symbol that reverses the distortion of the respective signal, and applying the coefficient for each data subcarrier to the corresponding data constellation point to determine a per subcarrier constellation point prediction, wherein the per subcarrier constellation point prediction predicts an original data constellation point corresponding to each data subcarrier at the respective OFDM transmitter prior to transmission of the respective signal.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for OFDM equalization using a DNN, including for example, any one or more of the stages from method 200 described above with respect to FIG. 2. Computing device 500, for example, may provide an operating environment for elements of operating environment 100 including, but not limited to, network 105, stations 110, OFDM transmitter 115, OFDM receiver 120, DNN 125, and communication channel 130. Elements of operating environment 100 (e.g., network 105, stations 110, OFDM transmitter 115, OFDM receiver 120, DNN 125, and communication channel 130) may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:
1. A method comprising:
  receiving, at an Orthogonal Frequency-Division Multiplexing (OFDM) receiver, a signal in a packet structure from an OFDM transmitter, the signal having distortion;
  extracting training constellation points, pilot constellation points, and data constellation points from the signal based on the packet structure, wherein each data constellation point corresponds to a data subcarrier within a data symbol of the signal;
  providing the training constellation points and the pilot constellation points as input for the data symbol to a Deep Neural Network (DNN);
  receiving as output from the DNN a coefficient for each data subcarrier within the data symbol that reverses the distortion; and
  applying the coefficient for each data subcarrier to the corresponding data constellation point to determine a per subcarrier constellation point prediction.
2. The method of claim 1, wherein the packet structure includes a preamble, a header, and a payload, and extracting the training constellation points, the pilot constellation points, and the data constellation points from the signal based on the packet structure comprises:
  extracting the training constellation points from the preamble; and
  extracting the pilot constellation points and the data constellation points from the data symbol within the payload.
3. The method of claim 1, further comprising:
  determining one or more of a per subcarrier confidence factor and a per subcarrier noise or interference estimate associated with the per subcarrier constellation point prediction.
4. The method of claim 1, further comprising:
  receiving information of a client associated with an access point that includes the OFDM transmitter.
5. The method of claim 4, further comprising:
  storing the client information, the coefficient for each data subcarrier, and the per subcarrier constellation point prediction in a database associated with the DNN.
6. The method of claim 1, wherein the per subcarrier constellation point prediction predicts an original data constellation point corresponding to each data subcarrier at the OFDM transmitter prior to transmission of the signal, and the method further comprises:
  training the DNN using labels comprised of a known original data constellation point corresponding to each data subcarrier at the OFDM transmitter.

7. The method of claim 6, further comprising:
performing a loss function using the predicted original data constellation point and the known original data constellation point.

8. The method of claim 1, further comprising:
conditioning the DNN with sideband information from the signal, the sideband information including one or more of location information, motion information, and orientation information.

9. An apparatus comprising:
a memory storage; and
a processing unit coupled to the memory storage, wherein the processing unit is operative to:
receive, at an Orthogonal Frequency-Division Multiplexing (OFDM) receiver, a signal in a packet structure from an OFDM transmitter, the signal having distortion;
extract training constellation points, pilot constellation points, and data constellation points from the signal based on the packet structure, wherein each data constellation point corresponds to a data subcarrier within a data symbol of the signal;
provide the training constellation points and the pilot constellation points as input for the data symbol to a Deep Neural Network (DNN);
receive as output from the DNN a coefficient for each data subcarrier within the data symbol that reverses the distortion; and
apply the coefficient for each data subcarrier to the corresponding data constellation point to determine a per subcarrier constellation point prediction.

10. The apparatus of claim 9, wherein the training constellation points and the pilot constellation points are known data values at the OFDM transmitter.

11. The apparatus of claim 10, wherein the DNN utilizes the known data values at the OFDM transmitter and the training constellation points and the pilot constellation points extracted from the signal to estimate the distortion and determine the coefficient operative to reverse the distortion.

12. The apparatus of claim 9, wherein the DNN has a monolithic architecture or a structured architecture comprising one or more sections of layers.

13. The apparatus of claim 12, wherein the DNN has a structured architecture comprising at least:
a first section of layers applied to learn independent representations of the training constellation points and the pilot constellation points provided as input;
a second section of layers applied to combine the independent representations learned by the first section; and
a third section of layers representing each data subcarrier within the data symbol and applied to generate the coefficient for each data subcarrier based on the combined independent representations.

14. The apparatus of claim 13, wherein the third section of layers represents groups of data subcarriers and is applied to generate a coefficient for each group of data subcarriers.

15. The apparatus of claim 9, wherein the per subcarrier constellation point prediction predicts an original data constellation point corresponding to each data subcarrier at the OFDM transmitter prior to transmission of the signal, and the processing unit is further operative to:
demap the predicted original data constellation point corresponding to each data subcarrier to yield a group of modified payload bits;
degroup the modified payload bits; and
decode and descramble the modified payload bits to yield original payload bits intended for transmission.

16. A method comprising:
receiving at an Orthogonal Frequency-Division Multiple Access (OFDMA) receiver:
a first signal in a packet structure transmitted by a first OFDMA transmitter over a first subchannel of a communication channel, the first signal having distortion; and
a second signal in the packet structure transmitted by a second OFDMA transmitter over a second subchannel of the communication channel, the second signal having distortion;
for each of the first signal and the second signal, extracting training constellation points, pilot constellation points, and data constellation points from the respective signal based on the packet structure, wherein each data constellation point corresponds to a data subcarrier within a data symbol of the respective signal; and
processing at least a portion of the first signal and the second signal separately to account for a difference in the distortion of the first signal and the second signal, wherein the processing for each of the first signal and the second signal includes:
providing the training constellation points and the pilot constellation points extracted from the respective signal as input for the data symbol to a Deep Neural Network (DNN);
receiving as output from the DNN a coefficient for each data subcarrier within the data symbol that reverses the distortion of the respective signal; and
applying the coefficient for each data subcarrier to the corresponding data constellation point to determine a per subcarrier constellation point prediction, wherein the per subcarrier constellation point prediction predicts an original data constellation point corresponding to each data subcarrier at the respective OFDMA transmitter prior to transmission of the respective signal.

17. The method of claim 16, further comprising:
providing the training constellation points and the pilot constellation points extracted from the first signal as input for the data symbol to a first DNN; and
providing the training constellation points and the pilot constellation points extracted from the second signal as input for the data symbol to a second DNN.

18. The method of claim 16, further comprising:
determining a group of subcarriers of the first signal and a group of subcarriers of the second signal to be processed separately based on OFDMA control data; and
processing the determined groups of subcarriers separately within one or more layers of the DNN or within separate DNNs.

19. The method of claim 16, further comprising:
masking the input for the data symbol to the DNN such that the first signal and the second signal are processed separately.

20. The method of claim 16, further comprising:
processing, by the DNN, the input for the data symbol per subchannel, wherein the first subchannel and the second subchannel are processed sequentially by the DNN or the first subchannel and the second channel are processed in parallel by separate DNNs.

* * * * *